(No Model.)

R. M. KEATING.
CRANK SHAFT AND BEARING FOR BICYCLES.

No. 568,767.  Patented Oct. 6, 1896.

Witnesses

Inventor
Robert M. Keating
By Allen Webster
Attorney

UNITED STATES PATENT OFFICE.

ROBERT M. KEATING, OF SPRINGFIELD, MASSACHUSETTS.

CRANK-SHAFT AND BEARING FOR BICYCLES.

SPECIFICATION forming part of Letters Patent No. 568,767, dated October 6, 1896.

Application filed December 10, 1895. Serial No. 571,615. (No model.)

*To all whom it may concern:*

Be it known that I, ROBERT M. KEATING, a citizen of the United States of America, residing in Springfield, in the county of Hampden and State of Massachusetts, have invented new and useful Improvements in Crank-Shafts and Bearings for Bicycles and other Like Vehicles, of which the following is a specification, reference being had to the accompanying drawings, and letters of reference marked thereon, in which drawings like letters of reference indicate like parts.

Figure 1:
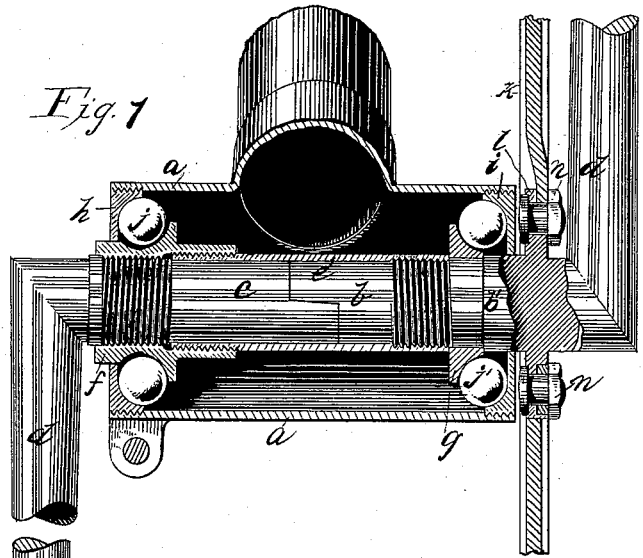
Figure 2:
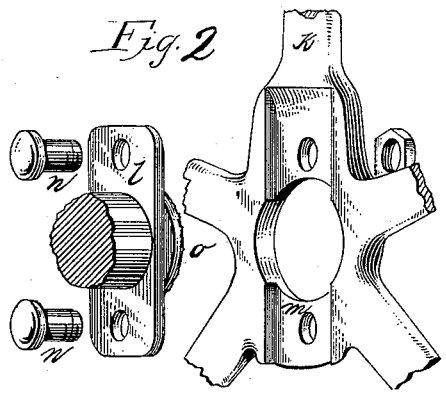

Figure 1 is a longitudinal view of my device with a part in section, and Fig. 2 illustrates the construction of the central portion of the sprocket-wheel and manner of securing it to the crank-shaft.

In detail, $a$ indicates the bracket; $b$ and $c$, the crank-shaft sections; $d$, the crank-arms; $e$, a tubular sleeve interiorly threaded at one end and exteriorly threaded at the opposite end; $f$ and $g$, cone pieces or bearings mounted in part upon the crank-shaft and in part on the sleeve; $h$ and $i$, cone pieces or bearings mounted one at each end in the bracket; $j$, balls; $k$, a sprocket-wheel; $l$, a plate mounted upon the crank-shaft section $b$; $m$, a recess in the sprocket-wheel adapted to receive the plate $l$, and $n$ bolts.

A detailed description of the construction of my device is as follows: The bracket $a$ has an opening through it preferably of the same diameter from end to end and is interiorly threaded at each end to receive the rings or bearings $h$ and $i$, which are provided with like threads upon their peripheries and which are provided with an interior curved or cone-shaped surface for the traverse of the balls.

The crank-shaft is made in two parts or sections, each part having a crank-arm $d$, preferably formed integral therewith, and the end portions of the two parts of the crank-shaft are adapted to interlock or engage with each other preferably by each part being cut away one-half its diameter, the longitudinal cut being inclined so as to form wedge-shaped or inclined surfaces in contact with each other. The sleeve $e$ is provided with an interior thread at one end to engage with the thread upon the shaft-section $b$, and at its opposite end it is provided with an exterior thread. The shaft-section $c$ is provided with a thread, and the cone-piece $f$ is interiorly threaded at one end to engage the exterior thread upon the end of the sleeve $e$, and at the opposite end is interiorly threaded to engage the thread upon the shaft-section $c$, the threads upon the shaft-section $c$ and the exterior of the sleeve $e$, however, being reversed, *i. e.*, one being a right and the other a left hand thread, so that when the parts are in engagement and the cone-piece $f$ be turned in one direction it will cause the shaft-section $c$ and the sleeve $e$ to separate, and if turned in the opposite direction will cause the shaft-section $c$ to be drawn into the sleeve $e$. The cone-piece $f$ is shaped exteriorly to form a runway or traverse for the balls. The cone-piece $g$, mounted upon the shaft-section $b$, is held in position by resting with one side against a shoulder $b'$ upon the shaft-section $b$, and the end of the sleeve $e$ bears against it upon the opposite side.

The shaft-section $b$ is provided with a plate $l$, preferably made integral therewith, to which the sprocket-wheel is secured by the employment of bolts $n$. The inner face of the sprocket-wheel is recessed, as shown at $n$ in Fig. 2, to receive the plate $l$.

The parts, being detached, are assembled as follows: The ring $i$ is first passed over the end of the shaft $b$ and into position. The cone-piece $g$ is next placed in position upon the shaft-section $b$ and the sleeve $e$ screwed upon this shaft-section until its end bears tightly against the cone-piece $g$. The piece $f$ is then placed either upon the end of the sleeve $e$ or upon the shaft-section $c$, with its threads in either instance just in engagement with the thread upon the part upon which it is placed. The parts thus attached are then passed into the end of the bracket, the balls $j$ being first placed in position there. The end of shaft-section $c$ is then passed into the sleeve $e$ until the part $f$ is brought to a position to engage the threads upon both the shaft-section and sleeve. The part $f$ is then turned in a direction to draw the shaft-section $c$ into the sleeve and is so turned until the end portion of the shaft-section $c$ is carried home in perfect engagement with the end portion of the shaft-section $b$. The balls $j$ are then inserted and the ring $h$ screwed home. The sprocket-wheel is then placed in position, if not previously attached.

In order to enable me to conveniently, accurately, and securely mount the sprocket-wheel upon the shaft, I provide the shaft, as before stated, or one section thereof, with a plate $l$, the same being preferably formed integral with the shaft, and I provide the central portion of the sprocket-wheel upon one of its faces with a recess adapted to receive the plate $l$, so that when the plate rests within the recess the strain will be borne by the edges of the plate bearing against the side walls of the recess in the wheel, so that the bolts or other means employed for holding the plate in the recess are not subjected to strain, and all danger of these parts becoming loosened by reason of wear is thus avoided; and to enable me to pass the sprocket-wheel over the crank-arm and to the desired position against the plate I provide the sprocket-wheel with a circular central opening of sufficient size to allow it to pass the point of junction between the shaft and arm, and as an opening of this size would be greater than the diameter of the shaft adjacent to the crank-arm I provide the shaft at a point adjacent to the plate $l$ and upon the side toward the crank-arm with an enlargement lettered $o$ in Fig. 2, such enlargement being of a size to snugly fit the circular central opening in the sprocket-wheel, thus insuring perfect accuracy in the mounting of the sprocket-wheel upon the shaft and at the same time rendering it readily removable over the crank-arm and without disturbing any of the mechanism, excepting, of course, the holding means between the plate and sprocket-wheel.

Having therefore described my invention, what I claim, and desire to secure by Letters Patent, is—

1. The combination of a crank-shaft consisting of two shaft-sections the ends of which are adapted to interlock and prevent rotation of one without the other; a sleeve engaging one of said parts by an interior threaded connection and provided at its opposite end with an exterior thread; the shaft-section $c$ being provided with a thread the reverse in direction from the exterior thread upon the sleeve; a cone-piece $f$ threaded to engage with the thread upon the sleeve and also the thread upon the shaft-section $c$; a cone-piece $g$ mounted upon the shaft-section $b$; rings $h$ and $i$ interiorly shaped for the traverse of the balls and threaded upon their peripheries and the bracket $a$ interiorly threaded at each end to receive the rings $h$ and $i$, substantially as and for the purposes stated.

2. The combination of a shaft-section $b$ having a cone-piece $g$ mounted thereon and resting against a shoulder $b'$; a sleeve $e$ interiorly threaded to engage a thread upon the shaft-section $b$ and bear with its end against the cone-piece $g$ and having its opposite end exteriorly threaded; a shaft-section $c$ having a threaded portion running in a direction opposite from the exterior thread upon the sleeve $e$; a cone-piece $f$ having an exterior annular ball-traversing recess and interiorly provided with a right and left hand thread to engage the thread upon the shaft-section $c$ and the exterior thread upon the sleeve; collars $h$ and $i$ having interior annular ball-traversing recesses and threaded upon their exterior; a bracket $a$ interiorly threaded at the ends to engage the peripherical threaded rings $h$ and $i$ and balls arranged in said ball-receiving channels, the inner ends of the shaft-sections being adapted to interlock, substantially as and for the purposes stated.

ROBERT M. KEATING.

Witnesses:
ALLEN WEBSTER,
CHAS. D. ROOD.